US009173173B2

(12) United States Patent
Wei et al.

(10) Patent No.: US 9,173,173 B2
(45) Date of Patent: Oct. 27, 2015

(54) METHOD AND DEVICE FOR CONTROLLING POWER OF COGNITIVE RADIO SYSTEM

(75) Inventors: Min Wei, Shenzhen (CN); Nan Zhao, Shenzhen (CN); Feng Li, Shenzhen (CN); Mei Chen, legal representative, Shenzhen (CN); Kaibo Tian, Shenzhen (CN); Yan Li, Shenzhen (CN)

(73) Assignee: ZTE CORPORATION (CN)

( * ) Notice: Subject to any disclaimer, the term of this patent is extended or adjusted under 35 U.S.C. 154(b) by 303 days.

(21) Appl. No.: 13/820,252

(22) PCT Filed: Oct. 25, 2010
(Under 37 CFR 1.47)

(86) PCT No.: PCT/CN2010/078092
§ 371 (c)(1),
(2), (4) Date: Sep. 23, 2013

(87) PCT Pub. No.: WO2012/027920
PCT Pub. Date: Mar. 8, 2012

(65) Prior Publication Data
US 2014/0038659 A1    Feb. 6, 2014

(30) Foreign Application Priority Data

Sep. 3, 2010    (CN) .......................... 2010 1 0276560

(51) Int. Cl.
*H04W 52/24*    (2009.01)
*H04W 52/36*    (2009.01)
*H04B 17/354*    (2015.01)

(52) U.S. Cl.
CPC ............ *H04W 52/24* (2013.01); *H04W 52/243* (2013.01); *H04W 52/367* (2013.01); *H04B 17/354* (2013.01)

(58) Field of Classification Search
CPC ...... H04W 16/14; H04W 72/085; H04W 5/50
See application file for complete search history.

(56) References Cited

U.S. PATENT DOCUMENTS

| 2008/0165754 | A1* | 7/2008 | Hu ................................. 370/342 |
| 2008/0207136 | A1* | 8/2008 | Tang et al. ...................... 455/73 |
| 2009/0011788 | A1  | 1/2009 | Shan et al. |
| 2010/0330919 | A1* | 12/2010 | Gurney et al. ............. 455/67.11 |
| 2012/0307817 | A1* | 12/2012 | Chen et al. .................... 370/338 |

FOREIGN PATENT DOCUMENTS

CN    101359941 A    2/2009

OTHER PUBLICATIONS

International Search Report for corresponding application No. PCT/CN2010/078092 filed on Oct. 25, 2010; Mail date Jun. 2, 2011.

* cited by examiner

*Primary Examiner* — Bobbak Safaipour
(74) *Attorney, Agent, or Firm* — Cantor Colburn LLP

(57) ABSTRACT

The disclosure provides a method and a device for controlling power of a cognitive radio system. The method comprises: measuring a system parameter of a cognitive radio system and a system parameter of a TV system located in an adjacent channel of the cognitive radio system; determining a maximum transmission power of the cognitive radio system according to the system parameter of the cognitive radio system and the system parameter of the TV system; controlling an actual transmission power of the cognitive radio system to be less than the maximum transmission power. In the disclosure, interference to the TV system can be reduced maximally, so that the sensitivity of a receiver inside the TV system is guaranteed.

16 Claims, 6 Drawing Sheets

METHOD AND DEVICE FOR CONTROLLING POWER OF COGNITIVE RADIO SYSTEM

TECHNICAL FIELD

The disclosure relates to the field of communications, in particular to a method and a device for controlling power of a Cognitive Radio System (CRS).

BACKGROUND

At present, spectrum resources are divided to various radio operators in a fixed manner, wherein this manner specifies a corresponding frequency band, a used bandwidth and a Radio Access Technology (RAT). With a continuous increase in a use frequency, the number of users and a traffic amount of a radio network, spectrum resources for radio communications become more and more scarce. Simultaneously, related observations show that, in some time periods, a large amount of available spectrum resources are idle. Therefore, a possibility exists that, in some areas, in some time periods, idle spectrum resources can be borrowed for radio communications, in this way, the utilization of spectrum resources can be improved effectively, and the scarcity of spectrum resources can be relieved.

In the related technologies, when a CRS borrows idle spectrum resources, interference may be caused to adjacent (adjacent channel or adjacent frequency channel) primary user system or other CRSs, this is because a transmitter of the CRS generally has out-of-band leakage during an energy radiation.

FIG. 1 is a schematic diagram of a spectrum mask according to an embodiment of the disclosure. As shown in FIG. 1, in the related technologies, a Television (TV) system and a radio communication system generally have out-of-band leakage, wherein the TV system comprises a Digital Video Broadcast (DVB), and the radio communication system comprises a Global system for Mobile Communication (GSM), a Universal Mobile Telecommunications System (UMTS) and a Long-Term Evolution (LTE).

Energy leaked to the adjacent channel causes interference to a TV system that is working on the adjacent channel, as a result, a floor noise of the TV system is increased, and the sensitivity of a receiver is influenced.

SUMMARY

The disclosure provides a method and a device for controlling power of a CRS, which solve the above problem that a transmitter in a CRS generally has out-of-band leakage during energy radiation to cause interference to a TV system that is working on an adjacent channel.

According to one aspect of the disclosure, a method for controlling power of a CRS is provided.

The method for controlling power of a CRS according to the disclosure comprises: measuring a system parameter of a cognitive radio system and a system parameter of a television (TV) system located in an adjacent channel of the cognitive radio system; determining a maximum transmission power of the cognitive radio system according to the system parameter of the cognitive radio system and the system parameter of the TV system; and controlling an actual transmission power of the cognitive radio system to be less than the maximum transmission power.

Preferably, according to the system parameter of the cognitive radio system and the system parameter of the TV system, the maximum transmission power $P_{TX}$ of the cognitive radio system is determined via a following formula: $P_{TX} = P_{RX\_TV} - R_{D/U} - G + ACIR + \max\{MCL, PC(d)\} - A$, wherein $P_{RX\_TV}$ refers to a reception power of a place in which a receiver of the TV system locates, $R_{D/U}$ refers to an expected useful-signal-to-interference-signal power ratio of the receiver of the TV system, G refers to a sum of a gain of a transmitting antenna of the cognitive radio system and a gain of a receiving antenna of the TV system, ACIR refers to an adjacent channel interference ratio of a coexistence system formed by the cognitive radio system and the TV system, MCL refers to a minimum coupling loss of the coexistence system, d refers to a distance between the receiver of the TV system and a transmitter of the cognitive radio system, PL(d) refers to a path loss between the cognitive radio system and the TV system, and A refers to an effective output power activity factor of the transmitting antenna of the cognitive radio system.

Preferably, the reception power $P_{RX\_TV}$ of the place in which the receiver of the TV system locates is determined via a following formula: $P_{RX\_TV} = \min\{P_{RX\_TV\_L}, P_{RX\_TV\_TV\_R}\}$, wherein $P_{RX\_TV\_L}$ refers to a TV reception power of a left adjacent channel of a TV white space occupied by the cognitive radio system, and $P_{RX\_TV\_R}$ refers to a TV reception power of a right adjacent channel of the TV white space occupied by the cognitive radio system.

Preferably, when there is no signal of the TV system in the right adjacent channel, $P_{RX\_TV} = P_{RX\_TV\_L}$; when there is no signal of the TV system in the left adjacent channel, $P_{RX\_TV} = P_{RX\_TV\_R}$.

Preferably, the system parameter of the cognitive radio system comprises at least one of: a gain of a transmitting antenna of the cognitive radio system, an adjacent channel interference ratio of a coexistence system formed by the cognitive radio system and the TV system, a minimum coupling loss of the coexistence system, and an effective output power activity factor of the transmitting antenna of the cognitive radio system; the system parameter of the TV system comprises at least one of: a gain of a receiving antenna of the TV system, a reception power of a place in which a receiver of the TV system locates, an expected useful-signal-to-interference-signal power ratio of the receiver of the TV system, a distance between the receiver of the TV system and a transmitter of the cognitive radio system, and a path loss between the cognitive radio system and the TV system.

Preferably, the actual transmission power of the cognitive radio system is controlled to be less than the maximum transmission power in at least one of the following ways: increase of filters, increase of spectrum isolation belts, and increase of a space interval between a receiver and a transmitter.

Preferably, after controlling the actual transmission power of the cognitive radio system to be less than the maximum transmission power, the method further comprises: determining a maximum value of an interference power received by the cognitive radio system; judging whether the maximum value is less than a maximum interference power allowable in the cognitive radio system; if it is judged that the maximum value is less than the maximum interference power allowable in the cognitive radio system, determining that the cognitive radio system and the TV system coexist.

Preferably, the maximum value I of the interference power received by the cognitive radio system is determined via a following formula: $I = P_{TX\_TV} + G + A_{TV} - ACIR_{TV} - PL(d)$, wherein $P_{TX\_TV}$ refers to a transmission power of a transmitter of the TV system, G refers to a sum of a gain of a transmitting antenna of the TV system and a gain of a receiving antenna of the cognitive radio system, $A_{TV}$ refers to an activity factor, $ACIR_{TV}$ refers to an adjacent channel leakage ratio, d refers to a distance between the transmitter of the TV system and a receiver of the cognitive radio system, and PL(d) refers to a path loss between the cognitive radio system and the TV system.

Preferably, if it is judged that the maximum value is not less than the maximum interference power allowable in the cognitive radio system, an out-of-band leakage of the TV system is reduced in at least one of the following ways: increase of filters, increase of spectrum isolation belts, increase of a space interval between a receiver and a transmitter, and pre-distortion.

According to another aspect of the disclosure, a device for controlling power of a cognitive radio system is provided.

The device for controlling power of a cognitive radio system according to the disclosure comprises: a measurement module, configured to measure a system parameter of a cognitive radio system and a system parameter of a TV system located in an adjacent channel of the cognitive radio system; a determination module, configured to determine a maximum transmission power of the cognitive radio system according to the system parameter of the cognitive radio system and the system parameter of the TV system; and a control module, configured to control an actual transmission power of the cognitive radio system to be less than the maximum transmission power.

Preferably, the determination module is further configured to determine the maximum transmission power $P_{TX}$ of the cognitive radio system via a following formula: $P_{TX} = P_{RX\_TV} - R_{D/U} - G + ACIR + \max\{MCL, PL(d)\} - A$, wherein $P_{RX\_TV}$ refers to a reception power of a place in which a receiver of the TV system locates, $R_{D/U}$ refers to an expected useful-signal-to-interference-signal power ratio of the receiver of the TV system, G refers to a sum of a gain of a transmitting antenna of the cognitive radio system and a gain of a receiving antenna of the TV system, ACIR refers to an adjacent channel interference ratio of a coexistence system formed by the cognitive radio system and the TV system, MCL refers to a minimum coupling loss of the coexistence system, d refers to a distance between the receiver of the TV system and a transmitter of the cognitive radio system, PL(d) refers to a path loss between the cognitive radio system and the TV system, and A refers to an effective output power activity factor of the transmitting antenna of the cognitive radio system.

Through the disclosure, the maximum transmission power of the CRS is determined according to a practical situation of the TV system that is working on the adjacent channel, and the actual transmission power of the CRS is controlled to be less than the maximum transmission power, therefore, the problem that the transmitter in the CRS generally has out-of-band leakage during the energy radiation to cause interference to the TV system that is working on the adjacent channel is solved, interference to the TV system can be reduced maximally, so that the sensitivity of the receiver inside the TV system is guaranteed.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

It should be noted that, embodiments in the application and features in the embodiments may be combined if not conflicted. The disclosure will be described in details below with reference to drawings and embodiments.

Figure 1:
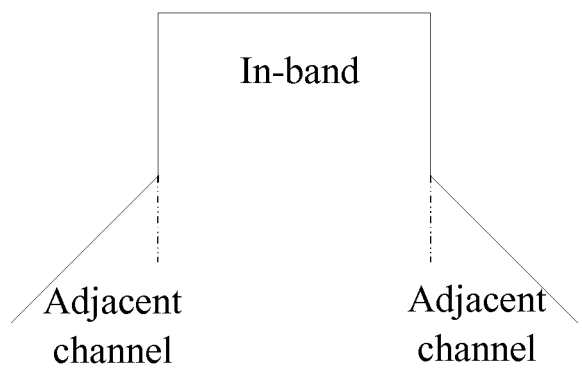
FIG. 1 is a schematic diagram of a spectrum mask according to an embodiment of the disclosure.

For a TV system (for example, a DVB), a general transmission spectrum mask is shown in FIG. 1. From this mask, it can be known that spectrum leakage exists generally, and this leakage will influence a TV system that is working on an adjacent channel. The embodiments of the disclosure also can be used in a radio communication system (for example, GSM/UMTS/LTE).

Figure 2:
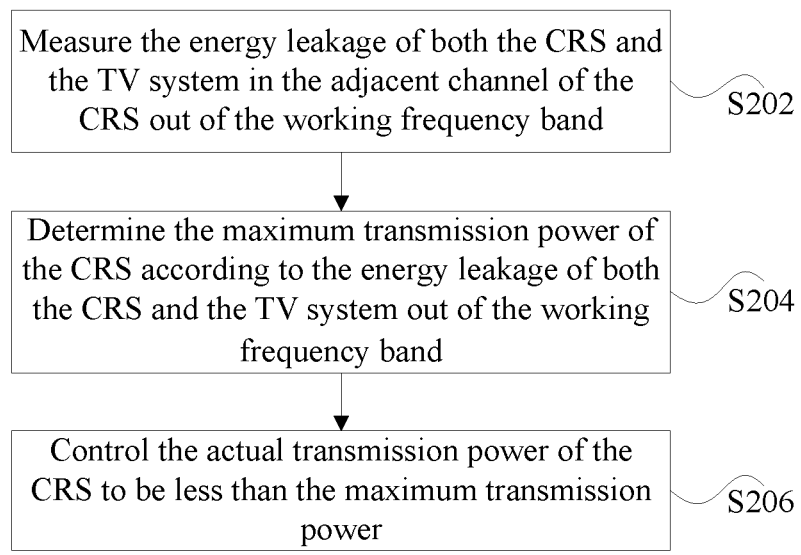
FIG. 2 is a flow chart of a method for controlling power of a CRS according to an embodiment of the disclosure.

An embodiment of the disclosure provides a method for controlling power of a CRS. FIG. 2 is a flow chart of a method for controlling power of a CRS according to the embodiment of the disclosure. The method for controlling power of a CRS comprises the following steps S202 to S206.

Step S202: A system parameter of a CRS and a system parameter of a TV system located in an adjacent channel of the CRS are measured.

Step S204: A maximum transmission power of the CRS is determined according to the system parameter of the CRS and the system parameter of the TV system.

Step S206: An actual transmission power of the CRS is controlled to be less than the maximum transmission power.

In the related technologies, a transmitter in the CRS generally has out-of-band leakage during energy radiation to cause interference to the TV system that is working on the adjacent channel. In the embodiment of the disclosure, the maximum transmission power of the CRS is determined in consideration of a practical situation of the TV system that is working on the adjacent channel, and the actual transmission power of the CRS is controlled to be less than the maximum transmission power, therefore, interference to the TV system can be reduced maximally, so that the sensitivity of the receiver inside the TV system is guaranteed.

It should be noted that, the system parameter of the CRS and the system parameter of the TV system comprise but not limited to energy leakage out of a working-band.

Preferably, according to the system parameter of the CRS and the system parameter of the TV system, the maximum transmission power $P_{TX}$ of the CRS is determined via the following formula:

$$P_{TX} = P_{RX\_TV} - R_{D/U} - G + ACIR + \max\{MCL, PL(d)\} - A$$

wherein $P_{RX\_TV}$ refers to a reception power of a place in which a receiver of the TV system locates, $R_{D/U}$ refers to an expected useful-signal-to-interference-signal power ratio of the receiver of the TV system, G refers to a sum of a gain of a transmitting antenna of the CRS and a gain of a receiving antenna of the TV system, ACIR refers to an adjacent channel interference ratio of a coexistence system formed by the CRS and the TV system (defined as a ratio of a transmission power of an interfering system (herein, regarded as the CRS) to an interference power received by the receiver of an interfered system (herein, regarded as the TV system)), MCL refers to a minimum coupling loss of the coexistence system, d refers to a distance between the receiver of the TV system and the transmitter of the CRS, PL(d) refers to a path loss between the CRS and the TV system, and A refers to an effective output power activity factor of the transmitting antenna of the CRS.

The meaning and derivation process of the above formula will be described in details below.

For a TV receiver, the maximum allowable interference power is $I_{MAX}$;

$$I_{MAX} = P_{RX\_TV} - R_{D/U} \tag{1}$$

wherein $R_{D/U}$ refers to the expected useful-signal-to-interference-signal power ratio of a TV receiver, and $P_{RX\_TV}$ refers to the reception power of the place in which the TV receiver locates.

Besides, assumed that an in-band transmission power of a CRS transmitter is $P_{TX}$, then a leakage power of the adjacent channel is I:

$$I = P_{TX} + G - ACIR - \max\{MCL, PL(d)\} \tag{2}$$

wherein G refers to a sum of a gain of the CRS transmitting antenna and a gain of the TV receiving antenna, ACIR refers to an adjacent channel interference ratio, MCL refers to a minimum coupling loss, PL refers to a path loss and is a function of distance d, d refers to a distance between the TV receiver and the CRS transmitter, and $\max\{\bullet\}$ refers to select a maximum value. When the TV receiver and the CRS transmitter share a station, MCL is selected; when the TV receiver and the CRS transmitter do not share a station, PL(d) is selected.

In the above, ACIR also can be expressed as:

$$\frac{1}{ACIR} = \frac{1}{ACLR} + \frac{1}{ACS} \tag{3}$$

wherein Adjacent Channel Leakage Ratio (ACLR) refers to an adjacent channel leakage ratio of the CRS transmitter, and Adjacent Channel Selectivity (ACS) refers to an adjacent channel selectivity of the TV receiver.

Considering that the adjacent channel leakage power I should be less than the maximum allowable interference power $I_{MAX}$, therefore, in combination with formula (1) and formula (2), the maximum allowable transmission power $P_{TX}$ of the CRS can be obtained as:

$$P_{TX} = P_{RX\_TV} - R_{D/U} - G + ACIR + \max\{MCL, PL(d)\}$$

Practically, an effective output power of the transmitting antenna should also take the activity factor A into consideration; therefore the calculation formula in the embodiment of the disclosure can be obtained as:

$$P_{TX} = P_{RX\_TV} - R_{D/U} - G + ACIR + \max\{MCL, PL(d)\} - A \tag{4}$$

Formula (4) is the maximum allowable transmission power of the CRS, which will not cause interference to a TV signal receiver of the adjacent channel. It should be noted that, whether the transmitter of the CRS is a transmitter of a Base station (BS) or a transmitter of a User Equipment (UE) is not distinguished herein. In a downlink of the CRS, influence to the TV receiver of the adjacent channel from the BS transmitter of the CRS needs to be considered, at this time, ACLR refers to the adjacent channel leakage ratio of the BS transmitter, ACS refers to the adjacent channel selectivity of the TV receiver, and the antenna gain takes the antenna gain of the BS of the CRS and that of the TV receiving system into consideration. In an uplink of the CRS, influence to the TV receiver of the adjacent channel from the UE transmitter of the CRS needs to be considered, at this time, ACLR refers to the adjacent channel leakage ratio of the UE transmitter, ACS refers to the adjacent channel selectivity of the TV receiver, and the antenna gain takes the antenna gain of the UE of the CRS and that of the TV receiving system into consideration.

It should be noted that, the above considerations are in allusion to interference to the TV receiver of the adjacent channel from the CRS. If the transmission power of the CRS is guaranteed not to be greater than $P_{TX}$, the CRS can coexist with the TV system.

Preferably, the reception power $P_{RX\_TV}$ of the place in which the receiver of the TV system locates is determined via a following formula: $P_{RX\_TV} = \min\{P_{RX\_TV\_L}, P_{RX\_TV\_R}\}$, wherein $P_{RX\_TV\_L}$ refers to a TV reception power of a left adjacent channel of a TV white space occupied by the cognitive radio system, and $P_{RX\_TV\_R}$ refers to a TV reception power of a right adjacent channel of the TV white space occupied by the cognitive radio system. Preferably, when there is no signal of the TV system in the right adjacent channel, $P_{RX\_TV} = P_{RX\_TV\_L}$; when there is no signal of the TV system in the left adjacent channel, $P_{RX\_TV} = P_{RX\_TV\_R}$.

$P_{RX\_TV}$ in the preferable embodiment can be calculated via the following formula (5):

$$P_{RX\_TV} = \begin{cases} P_{RX\_TV\_L} & (a) \\ \min\{P_{RX\_TV\_L}, P_{RX\_TV\_R}\} & (b) \\ P_{RX\_TV\_R} & (c) \end{cases} \tag{5}$$

wherein $P_{RX\_TV\_L}$ refers to a TV reception power of a left adjacent channel of a TeleVision White Space (TVWS) occupied by the CRS, $P_{RX\_TV\_R}$ refers to a TV reception power of a right adjacent channel of the TVWS occupied by the CRS, and $\min\{\bullet\}$ refers to select a minimum value. When there is no TV signal in the right adjacent channel, $P_{RX\_TV}$ is equal to value (a); when there is no TV signal in the left adjacent channel, $P_{RX\_TV}$ is equal to value (c); when there are TV signals in both left and right adjacent channels, $P_{RX\_TV}$ is equal to value (b).

Preferably, the system parameter of the CRS comprises at least one of the following parameters: a gain of a transmitting antenna of the CRS, an adjacent channel interference ratio of the CRS, a minimum coupling loss of the CRS, and an effective output power activity factor of the transmitting antenna of the CRS; the system parameter of the TV system comprises at least one of the following parameters: a gain of a receiving antenna of the TV system, a reception power of the place in which the receiver of the TV system locates, an expected useful-signal-to-interference-signal power ratio of the receiver of the TV system, a distance between the receiver of the TV system and the transmitter of the CRS, and a path loss between the CRS and the TV system.

Preferably, the actual transmission power of the cognitive radio system is controlled to be less than the maximum transmission power in at least one of the following ways: increase of filters, increase of spectrum isolation belts, and increase of a space interval between a receiver and a transmitter.

Preferably, after controlling the actual transmission power of the cognitive radio system to be less than the maximum transmission power, a maximum value of an interference power received by the cognitive radio system is determined; it is judged whether the maximum value is less than a maximum interference power allowable in the cognitive radio system; if it is judged that the maximum value is less than the maximum interference power allowable in the cognitive radio system, it is determined that the cognitive radio system and the TV system coexist.

In the preferable embodiment, influence to the CRS from the TV system is also considered, so as to guarantee a Quality of Service (QoS) of the CRS, thus to really guarantee the coexistence of the CRS and the TV system.

According to a specific CRS (for example, GSM/UMTS/LTE) or corresponding products of the specific CRS, the maximum allowable interference power $I_{MAX\_CR}$ can be looked up from relevant tables or calculated. For example, in accordance with criterions: calculation is performed according to a sensitivity loss (i.e., interference ratio) of 0.8 dB for a BS and according to a sensitivity loss of 3 dB for a UE. A floor noise of an Evolved-UMTS Terrestrial Radio Access (E-UTRAN) 10 MHz system is −99 dBm, so the maximum allowable interference power is −106 dBm. A floor noise of an E-UTRA 5 MHz system is −102 dBm, so the maximum allowable interference power is −109 dBm.

The received interference power I is compared with the allowable interference power $I_{MAX\_CR}$.

If $I<I_{MAX\_CR}$, the CRS can coexist with the TV system in the adjacent channel;

otherwise, according to the above two situations, interference to the TV system from the CRS and interference to the CRS from the TV system are considered. Only in a case that both interference powers meet relevant requirements, the CRS can coexist with the TV system.

Preferably, the maximum value I of the interference power received by the CRS is determined via the following formula:

$$I = P_{TX\_TV} + G + A_{TV} - ACIR_{TV} - PL(d) \qquad (6)$$

wherein $P_{TX\_TV}$ refers to a transmission power of a transmitter of the TV system, G refers to a sum of a gain of a transmitting antenna of the TV system and a gain of a receiving antenna of the cognitive radio system, $A_{TV}$ refers to an activity factor, $ACIR_{TV}$ refers to an adjacent channel leakage ratio, d refers to a distance between the transmitter of the TV system and a receiver of the cognitive radio system, and PL(d) refers to a path loss between the cognitive radio system and the TV system.

It should be noted that, the ACS of the CRS receiver is different for the BS and the UE, and the specific numerical values can be referred to related protocols or practical products. Simultaneously, the antenna gain G is the sum of the gain of the transmitting antenna of the TV system and the gain of the receiving antenna of the CRS, similarly, for the CRS receiver, the antenna gains of the BS and the UE are different.

Preferably, if it is judged that the maximum value is not less than the maximum interference power allowable in the cognitive radio system, an out-of-band leakage of the TV system is reduced in at least one of the following ways: increase of filters, increase of spectrum isolation belts, increase of a space interval between a receiver and a transmitter, and pre-distortion.

Preferably, after determining that the CRS can coexist with the TV system, the CRS performs spectrum adjustment and enters a corresponding TVWS for radio communications.

It should be noted that, practically, for the TVWS, more than one CRS may need it, and the above steps can meet the requirements when only one CRS needs to borrow the TVWS. However, when multiple CRSs need to borrow the TVWS simultaneously, there is a problem of spectrum etiquette, that is, each CRS must employ negotiation means and utilize some rules to determine the CRS that specifically borrows the TVWS.

In the embodiments of the disclosure, the interference power between different systems, particularly between the TV system and the radio communication system, can be measured effectively, and then the interference power is real-time controlled dynamically and automatically according to the corresponding interference, so as to achieve the purpose of coexistence of two systems.

The disclosure also provides a preferable embodiment that combines technical solutions of the above plurality of preferable embodiments. The preferable embodiment will be described in details with reference to FIG. 3 to FIG. 5.

Figure 3:
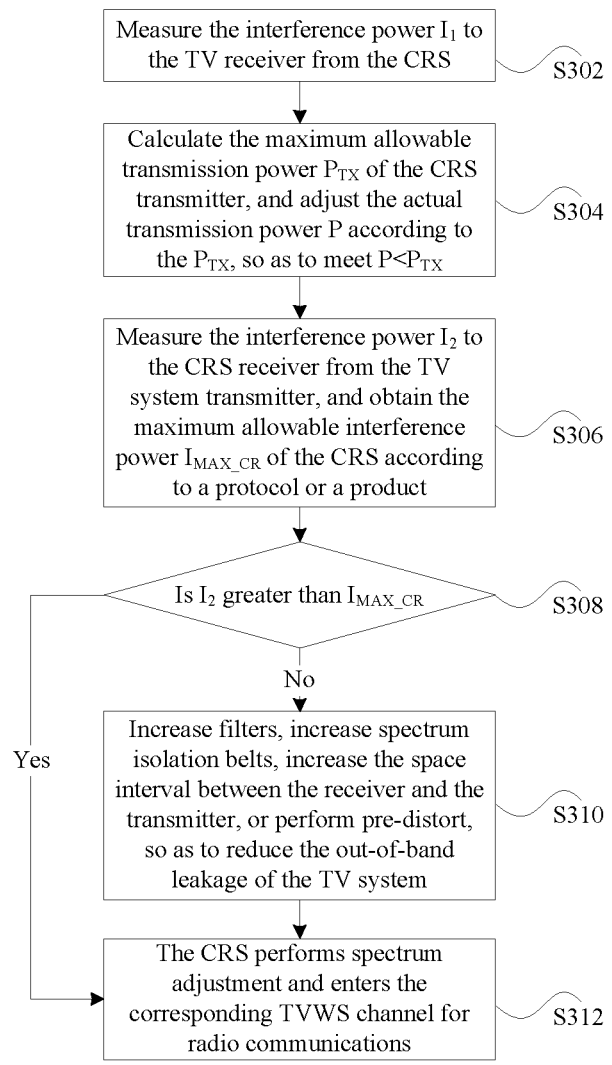
FIG. 3 is a flow chart of measurement and control according to an embodiment of the disclosure.
Figure 4:
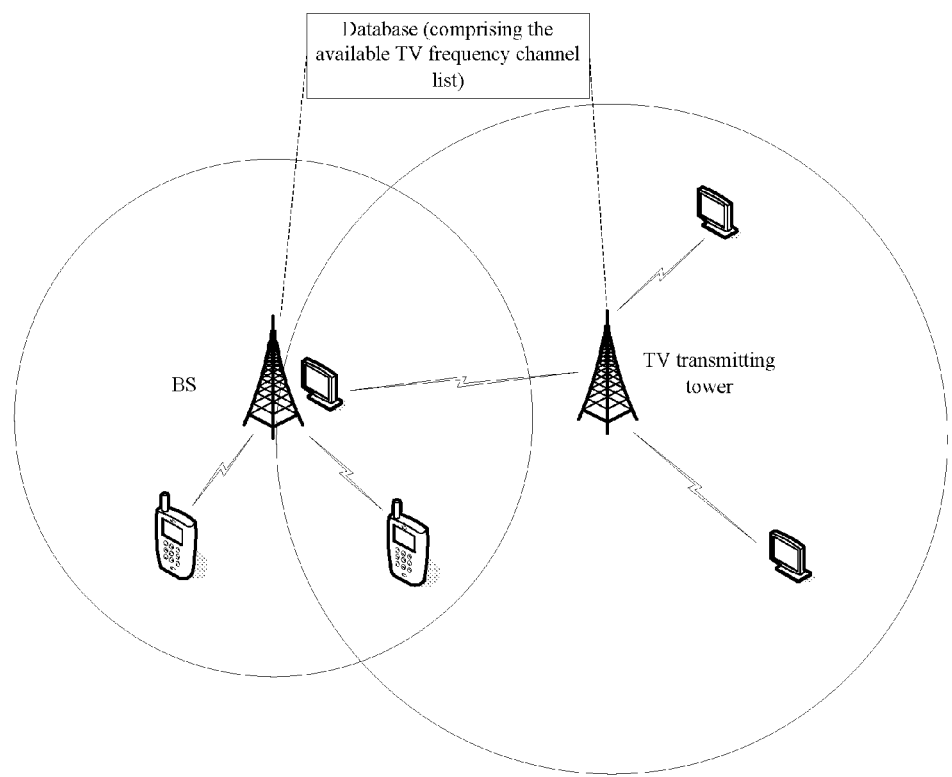
FIG. 4 is a diagram of a coexistence scene according to an embodiment of the disclosure.

FIG. 3 is a flow chart of measurement and control according to an embodiment of the disclosure, comprising three steps: measurement, calculation and adjustment. FIG. 4 is a schematic diagram of a coexistence scene according to an embodiment of the disclosure. In the scene, one transmitter of the TV system, one 3GPP radio communication BS and a plurality of users of the TV system and the radio communication system are shown.

The operating steps will be explained in details below.

Step S302: An interference power $I_1$ to a receiver of the TV system from the CRS is measured.

Practically, this step is provided to measure $P_{RX\_TV}$, that is, to measure a radiation power of the CRS transmitter at the TV receiver. Due to the uncertainty of a geographic location of the TV receiver and the lack of any report device in the TV receiver, it is difficult to measure $P_{RX\_TV}$. As known, the maximum interference to the TV receiver from the CRS transmitter occurs when the TV receiver locates within an adjacent area of the CRS transmitter, for example, the TV transmitter locates within 50 m of the CRS transmitter.

Herein, received signal strength can be obtained via the following methods:

dedicated devices with sensibility capability are used for measuring a designated channel, and a measured value is reported to the BS of the radio communication system;

a UE (if it is available and has the corresponding measurement capability) within the adjacent area of the BS is used for measuring the designated channel, and the measured value is reported to the BS that informs the UE of performing the measurement;

the BS couples its own transmission power at the antenna transmitting end, and feeds back to the base band processing unit.

Step S304: A maximum allowable transmission power $P_{TX}$ of the CRS transmitter is calculated according to formula (4), and an actual transmission power P is adjusted according to the $P_{TX}$, so as to meet $P<P_{TX}$.

To make the discussion convenient, formula (4) is mentioned again herein:

$$I_{MAX} = P_{RX\_TV} - R_{D/U} - G + ACIR + \max\{MCL, PL(d)\} - A$$

Attention should be paid that formula (4) is processed in a base band processing unit in the radio communication system. Herein, parameters: $R_{D/U}$, ACS of ACIR, and the receiving antenna gain in G, are obtained by the BS from a database. The information in the database is obtained from the report of the TV system. Besides, according to a blind zone range of the BS, the BS obtains a minimum distance between a place beyond the blind zone and the BS, so as to calculate MCL and PL(d). The transmission gain of the BS antenna, the activity factor A and ACLR can be obtained via a parameter storage unit of the BS or by accessing a database. The database is stored with various parameters of the radio communication system (comprising BS) and the TV system (comprising a TV transmitter and TV receivers, the types of which are as many as possible). For example, for information about the TV system contained in the database (television database), TV operators or third party operators are responsible for data recording, management and daily maintenance. The contents of the information comprise use situations of TV spectrum (frequency channel) of the TV operator in a local area or in a plurality of areas comprising the local area, i.e., ① a state of a spectrum (frequency channel) that is being used, comprising but not limited to: a channel number, a bandwidth, a possible duration, a D/U requirement ($R_{D/U}$ is an expected useful-signal-to-interference-signal power ratio of the TV receiver), a spectrum mask, a coverage range, an isolation belt, and other information; ② a state of a spectrum (frequency channel) that is not used, comprising but not limited to: a channel number, a working bandwidth, and other information.

A physical connection between the BS and the database and a physical connection between the TV BS and the database is realized by means of wire or wireless connection, and a logic transmission protocol, such as IP protocol, may be employed for communications.

Figure 5:
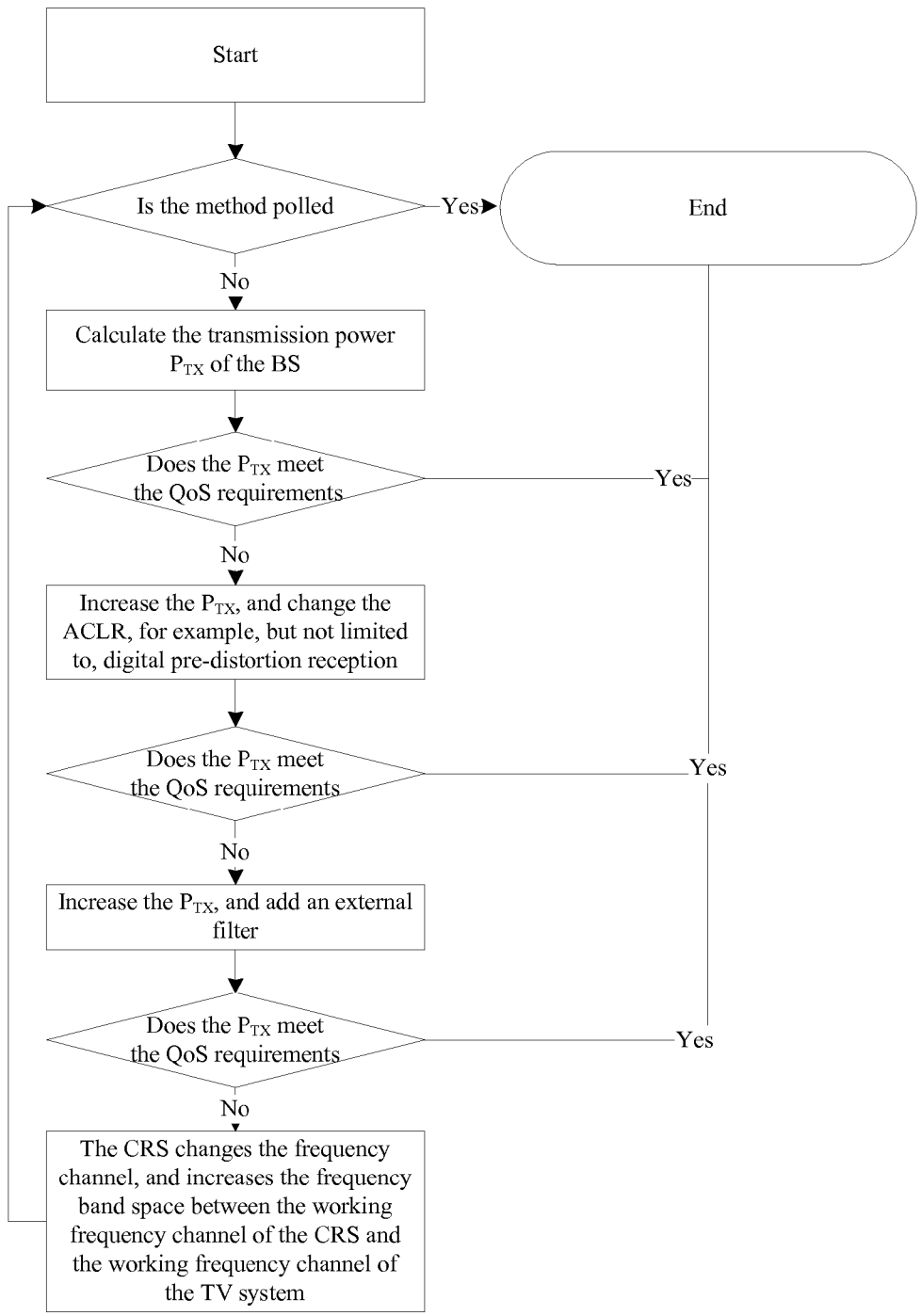
FIG. 5 is a flow chart of transmission of a base station (BS) according to an embodiment of the disclosure.

FIG. 5 is a flow chart of transmission of a BS according to an embodiment of the disclosure.

When the obtained transmission power $P_{TX}$ of the BS meets a QoS of the radio communication system, the BS can obtain the result by measuring (comprising but not limited to) a Bit Error Rate (BER) or a BLock Error Rate (BLER) in the system, and the BS performs transmission according to the transmission power $P_{TX}$.

When the obtained transmission power $P_{TX}$ of the BS cannot meet the QoS of the radio communication system, the BS adjusts the transmission power $P_{TX}$ and adds means which comprising but not limited to a digital pre-distortion algorithm, to change the ACLR of the BS transmitter, further to change the ACIR, so as to meet the QoS of the radio communication system.

When the addition of the digital pre-distortion algorithm still cannot meet the requirement, the ACLR can be improved by an external filter to further change the ACIR. Herein, one possibility is that the external filter always exists, and the BS can determine ON/OFF of the filter by means of control.

When all the above methods do not work, a method of changing a working frequency channel can be tried, for example, a spectrum space between a CRS working frequency channel and a TV working frequency channel is increased to meet the QoS requirement of the radio communication system.

Step S306: An interference power $I_2$ to the CRS receiver from the TV system is measured, and a maximum allowable interference power $I_{MAX\_CR}$ of the CRS is obtained according to a protocol or a product.

To make the discussion convenient, formula (6) is mentioned again herein:

$$I = P_{TX\_TV} + G + A_{TV} - ACIR_{TV} - PL(d).$$

Herein, the interference power $I_2$ is calculated according to formula (6). In the above, the BS obtains the transmission power $P_{TX\_TV}$ of the TV transmitter, the transmission gain, the activity factor $A_{TV}$ and the ACLR of the transmitter (the wanted $ACIR_{TV}$ is obtained from the ACLR and the ACS of the BS mentioned below according to formula (4)) by accessing the database (see FIG. 4). Besides, the BS also should obtain geographic location coordinates (comprising longitude and latitude) of the TV transmitter through the database, so as to determine the calculation of PL(d). Besides, the BS and the UE also should obtain their own geographic location coordinates (comprising longitude and latitude) through a Global Positioning System (GPS) or some locating algorithms or the database.

Usually, the ACS value of the BS is relatively large, and according to a property of the ACIR, the ACS of the BS may be not considered when the ACIR is estimated, but the ACS of the BS should be considered when the ACIR is calculated precisely.

According to a specific CRS (for example, GSM/UMTS/LTE) or corresponding products thereof, the maximum allowable interference power $I_{MAX\_CR}$ can be looked up from relevant tables or calculated. For example, in accordance with criterions: calculation is performed according to a sensitivity loss (i.e., interference ratio) of 0.8 dB for the BS and a sensitivity loss of 3 dB for the UE. A floor noise of an Evolved-UMTS Terrestrial Radio Access (E-UTRAN) 10 MHz system is −99 dBm, so the maximum allowable interference power is −106 dBm; the floor noise of an E-UTRA 5 MHz system is −102 dBm, so the maximum allowable interference power is −109 dBm. The received interference power I is compared with the allowable interference power $I_{MAX\_CR}$.

Step S308: It is judged whether $I_2$ is less than $I_{MAX\_CR}$, if so, jump to step S312, otherwise, enter step S310.

If $I_2$ is less than $I_{MAX\_CR}$, it is indicated that interference caused by the TV system to the CRS receiver in the adjacent channel will not influence the normal working of the CRS receiver. If $I_2$ is greater than $I_{MAX\_CR}$, it is indicated that interference caused by the TV system to the CRS receiver in the adjacent channel has influenced the normal working of the CRS receiver.

Step S310: It is ensured that $I_2$ is less than $I_{MAX\_CR}$ by one or combination of the following ways, for example, increase of filters, increase of spectrum isolation belts, increase of a space interval between the receiver and the transmitter and pre-distortion, so as to reduce the out-of-band leakage of the TV system.

If the transmission power of the transmitter of the TV system is controllable and base band processing is available, the ACLR of the transmitter of the TV system can be changed by adjusting the transmission power of the transmitter of the TV system and employing means comprising but not limited to a digital pre-distortion algorithm, further the ACIR can be changed, so as to meet the QoS of the radio communication system.

When the addition of the digital pre-distortion algorithm still cannot meet the requirement, the ACLR can be improved by an external filter to further change the ACIR. Herein, one possibility is that the external filter always exists, and the BS can determine ON/OFF of the filter by means of control.

When all the above methods do not work, a method of changing a working frequency channel can be tried, for example, a spectrum space between a CRS working frequency channel and a TV working frequency channel is increased to meet the QoS requirement of the radio communication system.

Step S312: The CRS performs spectrum adjustment and enters a corresponding TVWS for radio communications.

Practically, for the TVWS, more than one CRS may need it, and the above steps can meet the requirements when only one CRS needs to borrow the TVWS. However, when multiple CRSs need to borrow the TVWS simultaneously, there is a problem of spectrum etiquette, that is, each CRS must employ negotiation means and utilize some rules to determine the CRS that specifically borrows the TVWS. Contents in this part exceed the description range of the specification and will not be discussed here. Besides, the embodiment does not involve a case in which the CRS and the TV system occupy a same channel and a case in which different CRSs occupy a same channel.

It should be noted that, steps shown in the flow charts in the drawings may be executed in a computer system, such as a group of computer executable instructions; furthermore, although a logic sequence is shown in the flow charts, in some cases, the shown or described steps may be executed in an order different from that shown herein.

Figure 6:
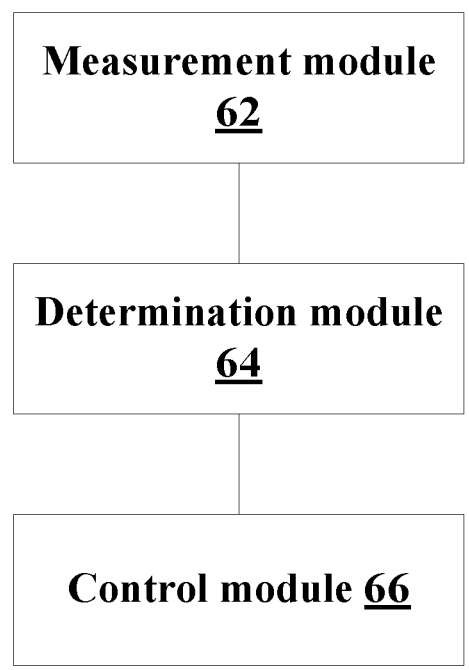
FIG. 6 is a structure block diagram of a device for controlling power of a CRS according to an embodiment of the disclosure.

An embodiment of the disclosure provides a device for controlling power of a CRS, which can be used for implementing the method for controlling power of a CRS. FIG. 6 is a structure block diagram of a device for controlling power of a CRS according to the embodiment of the disclosure. The device comprises a measurement module 62, a determination module 64 and a control module 66. The device will be described in details below.

The measurement module 62 is configured to measure a system parameter of a CRS and a system parameter of a TV system located in an adjacent channel of the CRS. The determination module 64 is coupled with the measurement module 62 and configured to determine a maximum transmission power of the CRS according to the system parameter of the CRS and the system parameter of the TV system measured by the measurement module 62. The control module 66 is coupled with the determination module 64 and configured to control an actual transmission power of the CRS to be less than the maximum transmission power determined by the determination module 64.

In the related technologies, a transmitter in the CRS generally has out-of-band leakage during energy radiation to cause interference to the TV system that is working on the adjacent channel. In the embodiment of the disclosure, the maximum transmission power of the CRS is determined in consideration of a practical situation of the TV system that is working on the adjacent channel, and the actual transmission power of the CRS is controlled to be less than the maximum transmission power, therefore, interference to the TV system can be reduced maximally, so that the sensitivity of the receiver inside the TV system is guaranteed.

It should be noted that, the system parameter of the CRS and the system parameter of the TV system comprise but not limited to energy leakage out of a working-band.

Preferably, the determination module is further configured to determine the maximum transmission power $P_{TX}$ of the CRS via the following formula:

$$P_{TX}=P_{RX\_TV}-R_{D/U}-G+ACIR+\max\{MCL,PL(d)\}-A$$

wherein $P_{RX\_TV}$ refers to a reception power of a place in which a receiver of the TV system locates, $R_{D/U}$ refers to an expected useful-signal-to-interference-signal power ratio of the receiver of the TV system, G refers to a sum of a gain of a transmitting antenna of the CRS and a gain of a receiving antenna of the TV system, ACIR refers to an adjacent channel interference ratio of a coexistence system formed by the CRS and the TV system (defined as a ratio of a transmission power of an interfering system (herein, regarded as the CRS) to an interference power received by the receiver of an interfered system (herein, regarded as the TV system)), MCL refers to a minimum coupling loss of the coexistence system, d refers to a distance between the receiver of the TV system and the transmitter of the CRS, PL(d) refers to a path loss between the CRS and the TV system, and A refers to an effective output power activity factor of the transmitting antenna of the CRS.

It should be noted that, in the embodiments of the device, the device for controlling power of a CRS is corresponding to the embodiments of the method, and the specific implementation processes have been described in details in the embodiments of the method and will not be described again herein.

In conclusion, according to the embodiments of the disclosure, a method and a device for controlling power of a CRS are provided. By determining the maximum transmission power of the CRS and controlling the actual transmission power of the CRS to be less than the maximum transmission power, the problem that the transmitter of the CRS generally has out-of-band leakage during the energy radiation to cause interference to the TV system that is working on the adjacent channel is solved, interference to the TV system can be reduced maximally, so that the sensitivity of the receiver inside the TV system is guaranteed.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for controlling power of a cognitive radio system, comprising:
    measuring a system parameter of a cognitive radio system and a system parameter of a television (TV) system located in an adjacent channel of the cognitive radio system;
    determining a maximum transmission power of the cognitive radio system according to the system parameter of the cognitive radio system and the system parameter of the TV system; and
    controlling an actual transmission power of the cognitive radio system to be less than the maximum transmission power, wherein after controlling the actual transmission power of the cognitive radio system to be less than the maximum transmission power, the method further comprises: determining a maximum value of an interference power received by the cognitive radio system; judging whether the maximum value is less than a maximum interference power allowable in the cognitive radio system; if it is judged that the maximum value is less than the maximum interference power allowable in the cognitive radio system, determining that the cognitive radio system and the TV system coexist.

2. The method according to claim 1, wherein according to the system parameter of the cognitive radio system and the system parameter of the TV system, the maximum transmission power $P_{TX}$ of the cognitive radio system is determined via a following formula:

$$P_{TX}=P_{Rx\_TV}-R_{D/U}-G+ACIR+\max\{MCL,PL(d)\}-A$$

wherein $P_{Rx\_TV}$ refers to a reception power of a place in which a receiver of the TV system locates, $R_{D/U}$ refers to an expected useful-signal-to-interference-signal power ratio of the receiver of the TV system, G refers to a sum of a gain of a transmitting antenna of the cognitive radio system and a gain of a receiving antenna of the TV system, ACIR refers to an adjacent channel interference ratio of a coexistence system formed by the cognitive radio system and the TV system, MCL refers to a minimum coupling loss of the coexistence system, d refers to a distance between the receiver of the TV system and a transmitter of the cognitive radio system, PL(d) refers to a path loss between the cognitive radio system and the TV system, and A refers to an effective output power activity factor of the transmitting antenna of the cognitive radio system.

3. The method according to claim 2, wherein the reception power $P_{RX\_TV}$ of the place in which the receiver of the TV system locates is determined via a following formula:

$$P_{RX\_TV}=\min\{P_{RX\_TV\_L},P_{RX\_TV\_R}\}$$

wherein $P_{RX\_TV\_L}$ refers to a TV reception power of a left adjacent channel of a TV white space occupied by the cognitive radio system, and $P_{RX\_TV\_R}$ refers to a TV reception power of a right adjacent channel of the TV white space occupied by the cognitive radio system.

4. The method according to claim 3, wherein when there is no signal of the TV system in the right adjacent channel, $P_{RX\_TV}=P_{RX\_TV\_L}$; when there is no signal of the TV system in the left adjacent channel, $P_{RX\_TV}=P_{RX\_TV\_R}$.

5. The method according to claim 1, wherein
the system parameter of the cognitive radio system comprises at least one of:
a gain of a transmitting antenna of the cognitive radio system, an adjacent channel interference ratio of a coexistence system formed by the cognitive radio system and the TV system, a minimum coupling loss of the coexistence system, and an effective output power activity factor of the transmitting antenna of the cognitive radio system;
the system parameter of the TV system comprises at least one of:
a gain of a receiving antenna of the TV system, a reception power of a place in which a receiver of the TV system locates, an expected useful-signal-to-interference-signal power ratio of the receiver of the TV system, a distance between the receiver of the TV system and a transmitter of the cognitive radio system, and a path loss between the cognitive radio system and the TV system.

6. The method according to claim 1, wherein the actual transmission power of the cognitive radio system is controlled to be less than the maximum transmission power in at least one of the following ways:
increase of filters, increase of spectrum isolation belts, and increase of a space interval between a receiver and a transmitter.

7. The method according to claim 1, wherein the maximum value I of the interference power received by the cognitive radio system is determined via a following formula:

$$I=P_{TX\_TV}+G+A_{TV}-\text{ACIR}_{TV}-\text{PL}(d)$$

wherein $P_{TX\_TV}$ refers to a transmission power of a transmitter of the TV system, G refers to a sum of a gain of a transmitting antenna of the TV system and a gain of a receiving antenna of the cognitive radio system, $A_{TV}$ refers to an activity factor, $\text{ACIR}_{TV}$ refers to an adjacent channel leakage ratio, d refers to a distance between the transmitter of the TV system and a receiver of the cognitive radio system, and PL(d) refers to a path loss between the cognitive radio system and the TV system.

8. The method according to claim 1, wherein if it is judged that the maximum value is not less than the maximum interference power allowable in the cognitive radio system, an out-of-band leakage of the TV system is reduced in at least one of the following ways:
increase of filters, increase of spectrum isolation belts, increase of a space interval between a receiver and a transmitter, and a pre-distortion.

9. A device for controlling power of a cognitive radio system, comprising:
a hardware processor configured to perform a function of a measurement module, a determination module and a control module, wherein
a measurement module, configured to measure a system parameter of a cognitive radio system and a system parameter of a TV system located in an adjacent channel of the cognitive radio system;
a determination module, configured to determine a maximum transmission power of the cognitive radio system according to the system parameter of the cognitive radio system and the system parameter of the TV system; and
a control module, configured to control an actual transmission power of the cognitive radio system to be less than the maximum transmission power, wherein after controlling the actual transmission power of the cognitive radio system to be less than the maximum transmission power, the method further comprises: determining a maximum value of an interference power received by the cognitive radio system; judging whether the maximum value is less than a maximum interference power allowable in the cognitive radio system; if it is judged that the maximum value is less than the maximum interference power allowable in the cognitive radio system, determining that the cognitive radio system and the TV system coexist.

10. The device according to claim 9, wherein the determination module is further configured to determine the maximum transmission power $P_{TX}$ of the cognitive radio system via a following formula:

$$P_{TX}=P_{RX\_TV}-R_{D/U}-G+\text{ACIR}+\max\{\text{MCL},\text{PL}(d)\}-A$$

wherein $P_{Rx\_TV}$ refers to a reception power of a place in which a receiver of the TV system locates, $R_{D/U}$ refers to an expected useful-signal-to-interference-signal power ratio of the receiver of the TV system, G refers to a sum of a gain of a transmitting antenna of the cognitive radio system and a gain of a receiving antenna of the TV system, ACIR refers to an adjacent channel interference ratio of a coexistence system formed by the cognitive radio system and the TV system, MCL refers to a minimum coupling loss of the coexistence system, d refers to a distance between the receiver of the TV system and a transmitter of the cognitive radio system, PL(d) refers to a path loss between the cognitive radio system and the TV system, and A refers to an effective output power activity factor of the transmitting antenna of the cognitive radio system.

11. The method according to claim 1, wherein the maximum value I of the interference power received by the cognitive radio system is determined via a following formula:

$$I=P_{TX\_TV}+G+A_{TV}-\text{ACIR}_{TV}-\text{PL}(d)$$

wherein $P_{TX\_TV}$ refers to a transmission power of a transmitter of the TV system, G refers to a sum of a gain of a transmitting antenna of the TV system and a gain of a receiving antenna of the cognitive radio system, $A_{TV}$ refers to an activity factor, $\text{ACIR}_{TV}$ refers to an adjacent channel leakage ratio, d refers to a distance between the transmitter of the TV system and a receiver of the cognitive radio system, and PL(d) refers to a path loss between the cognitive radio system and the TV system.

12. The method according to claim 1, wherein the maximum value I of the interference power received by the cognitive radio system is determined via a following formula:

$$I = P_{TX\_TV} + G + A_{TV} - ACIR_{TV} - PL(d)$$

wherein $P_{TX\_TV}$ refers to a transmission power of a transmitter of the TV system, G refers to a sum of a gain of a transmitting antenna of the TV system and a gain of a receiving antenna of the cognitive radio system, $A_{TV}$ refers to an activity factor, $ACIR_{TV}$ refers to an adjacent channel leakage ratio, d refers to a distance between the transmitter of the TV system and a receiver of the cognitive radio system, and PL(d) refers to a path loss between the cognitive radio system and the TV system.

13. The method according to claim 1, wherein the maximum value I of the interference power received by the cognitive radio system is determined via a following formula:

$$I = P_{TX\_TV} + G + A_{TV} - ACIR_{TV} - PL(d)$$

wherein $P_{TX\_TV}$ refers to a transmission power of a transmitter of the TV system, G refers to a sum of a gain of a transmitting antenna of the TV system and a gain of a receiving antenna of the cognitive radio system, $A_{TV}$ refers to an activity factor, $ACIR_{TV}$ refers to an adjacent channel leakage ratio, d refers to a distance between the transmitter of the TV system and a receiver of the cognitive radio system, and PL(d) refers to a path loss between the cognitive radio system and the TV system.

14. The method according to claim 1, wherein if it is judged that the maximum value is not less than the maximum interference power allowable in the cognitive radio system, an out-of-band leakage of the TV system is reduced in at least one of the following ways:

increase of filters, increase of spectrum isolation belts, increase of a space interval between a receiver and a transmitter, and a pre-distortion.

15. The method according to claim 1, wherein if it is judged that the maximum value is not less than the maximum interference power allowable in the cognitive radio system, an out-of-band leakage of the TV system is reduced in at least one of the following ways:

increase of filters, increase of spectrum isolation belts, increase of a space interval between a receiver and a transmitter, and a pre-distortion.

16. The method according to claim 1, wherein if it is judged that the maximum value is not less than the maximum interference power allowable in the cognitive radio system, an out-of-band leakage of the TV system is reduced in at least one of the following ways:

increase of filters, increase of spectrum isolation belts, increase of a space interval between a receiver and a transmitter, and a pre-distortion.

* * * * *